Jan. 30, 1962    L. HELLER ETAL    3,018,640
APPARATUS FOR UTILIZING THE HEAT WHICH IS OBTAINED WITH THE
PRODUCTION OF COLD IN REFRIGERATING PLANTS
Filed Dec. 30, 1958
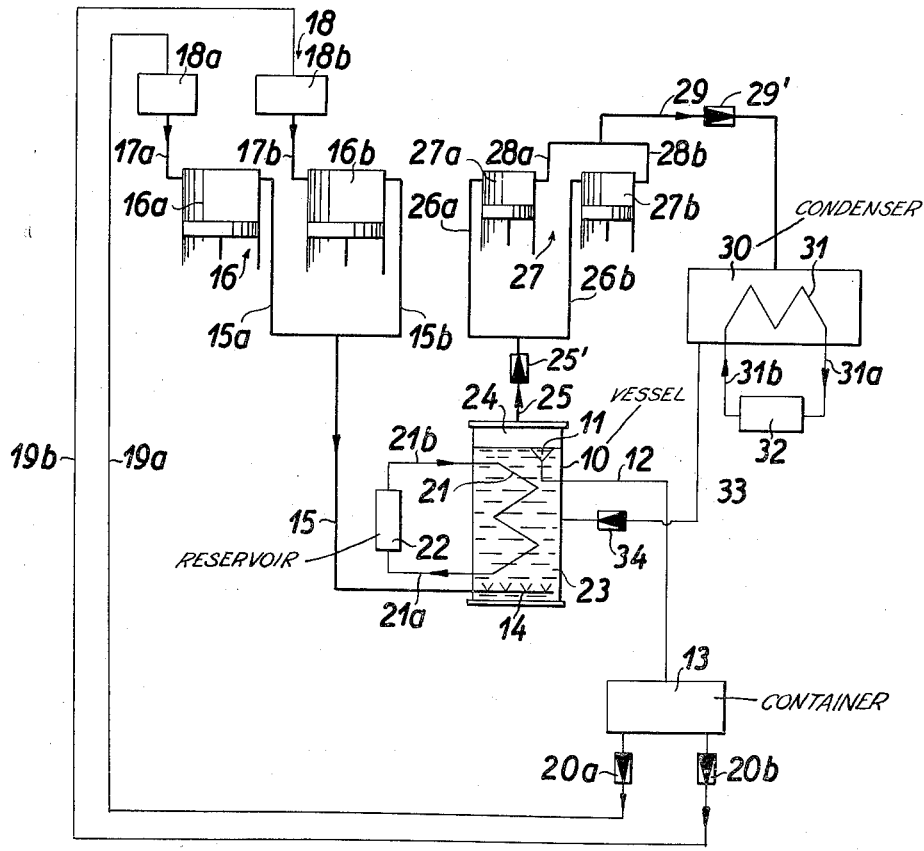
INVENTORS
Laszlo Heller &
Gyula Farago
BY
ATTORNEYS United States Patent Office 3,018,640
Patented Jan. 30, 1962

3,018,640
APPARATUS FOR UTILIZING THE HEAT WHICH IS OBTAINED WITH THE PRODUCTION OF COLD IN REFRIGERATING PLANTS
László Heller and Gyula Faragó, Budapest, Hungary, assignors to Licencia Talalmanyokat Ertekesitae Vallalet, Budapest/V, Hungary
Filed Dec. 30, 1958, Ser. No. 783,978
9 Claims. (Cl. 62—335)

This invention relates to a method of and apparatus for utilizing the heat which is obtained with the production of cold in refrigerating plants for heating purposes.

As is known, from the standpoint of thermodynamics a heat pump is, in essence, the same as a refrigerating machine. In both, an amount of heat extracted or withdrawn at a low temperature is brought to a higher temperature by an addition of a quantity of external energy, whereafter this amount of heat, together with the added or supplied energy, is abducted or taken off by means of water or air. Both the heat pump and the refrigerating machine comprise substantially like apparatus, the respective names being employed to designate the difference of use only.

One of the basic characteristics of any known refrigerating machine is that it supplies only cold, the amount of heat withdrawn at higher temperatures being generally not exploited. By way of contrast, in a heat pump only the amount of heat extracted at higher temperatures is utilized, the cooling down of the heat source of lower temperature being usually left unexploited. As a result of such differences in the intended uses of both types of apparatus, of course, various respective temperatures and pressures prevail in the associated thermal cycles.

The use of a heat pump in conjunction with a refrigerating machine is generally economical if both the cold and heat produced can be utilized simultaneously. By way of example, such utilization is possible particularly in icehouses, where the produced cold may serve for cooling the refrigerating and freezing rooms, while the generated heat may be employed for heating purposes, e.g., for heating the offices and lodgings of the attendants, for cooking, drying, etc.

Inasmuch as the refrigerating machine, in accordance with its principles of operation, yields a certain amount of waste heat, i.e., the heat withdrawn in the condenser of the apparatus, the principal function of the heat pump is to bring this waste heat, which is generally available at a low temperatture of about 25 to 30° C., to a relatively higher temperature suitable for heating purposes. Consequently, the operational economy attendant the use of a heat pump is considerably enhanced both from the standpoint of investment costs and from the standpoint of the costs of energy consumption. This can best be appreciated by considering that when a refrigerating machine is initially constructed to operate independently of heating requirements in any way, the costs of providing it with a compressor connected in series therewith and suitable for heating form but a fraction of the costs entailed in the construction of a heating plant or apparatus equipped with a heat pump, since a great part of the heating plant is then constituted by the refrigerating machine.

Nevertheless, heating by means of a heat pump is connection with refrigerating machines and icehouses or other types of buildings or inhabited structures has not come into general use. This is chiefly due to the fact that, with apparatus hitherto known, special control and safety means of substantially intricate nature must be employed so as to adapt the actual output of the heat pump, on the one hand, to the refrigerating output and, on the other hand, to the requirements of the heating operation. Moreover, where the common heating power yielded by the momentary refrigerating capacity and compressor output has been less than the heat requirement, it has been necessary to utilize special means for providing a substitute or auxiliary source of heat energy.

Obviously, with regard to fluctuations of the heat requirements, the aforesaid possibility of the waste heat output of the refrigerating machine being less than the heat required for the heating operation must be considered in all refrigerating plants. Furthermore, it must be kept in mind that the production of cold may sometimes be completely shut off. This, of course, would require the provision, besides the heat pump, of a substitute heating system of full value, e.g., a heating system operated by steam or the like. In turn this would increase the overall investment costs in such a manner that the economy of heating by means of a heat pump would be rendered dubious in spite of a number of preferable and advantageous circumstances and characteristics.

The principal object of the present invention is, therefore, the provision of means designed for and capable of obviating the aforesaid inconveniences, drawbacks and disadvantages of known heat pump-equipped heating systems.

Another important object of the present invention is the provision of means, in such a heating system, ensuring that the entire heat requirement is covered by the capacity of the heat pump even if the total amount of heat corresponding to the refrigerating capacity and the compressor work happens at some time to be less than the necessary value.

A further object of the invention is to provide a method of and means for maintaining automatically a condition of balance in the overall system under all circumstances, regardless of whether the waste heat yielded by the refrigerating capacity is greater or less than or just equal to the heat requirement.

A related object of the invention, thus, is the provision of means ensuring that such a condition of balance can be secured even when the refrigerating plant is completely or almost completely out of operation.

A still further object of the invention is to provide means enabling the aforesaid requirements to be fulfilled by the heat pump automatically and solely by means of heat exchange effects without necessitating special control means or switch-over systems.

More specifically, it will be appreciated that during the combined operation of a refrigerating machine and a heat pump as and for the purposes mentioned hereinabove, it is possible that there may arise a difference between the heat of condensation liberated in the course of the refrigerating process and the heat provided by an auxiliary source or reservoir as determined by the heat requirement of the heat pump, which difference must be automatically compensated for in accordance with the aforesaid objects of the present invention. This result is most effectively attained by providing as a joint element an intermediate stage between the refrigerating machine and the heat pump, which intermediate stage acts as the stage of condensation of the refrigerating machine, the liquid phase of the working medium of the refrigerating machine and of the heat pump being employed in this stage as a control medium, and a coolant supplied independently to the intermediate stage serving, on the one hand, for absorbing any excess heat of condensation liberated during the refrigerating process and, on the other hand, as a heat source for the heat pump. In this manner, the automatic control of the operation is performed by means of heat exchange between the working medium and the coolant.

The principles of the present invention may be implemented most efficaciously by means of an apparatus or system wherein the condenser of a refrigerating machine is connected to and constitutes a part of a heat pump, the condenser being constructed in the form of a fluid container having a return connection to the refrigerating machine through an overflow pipe.

The foregoing and other objects, characteristics and advantages of the present invention will be more fully explained in the following description thereof, reference being had to the accompanying drawing in which a representative embodiment of a combined heating and refrigerating system of the aforesaid type is schematically and diagrammatically illustrated.

Referring now more specifically to the drawing, the combined refrigerating-heating system according to the present invention includes, as the part common to both the refrigerating machine and the heat pump, a vessel or tank 10 which is provided adjacent its upper end region with an overflow pipe or opening 11. The latter communicates through a pipe or conduit 12 with a liquid-collecting container 13. A foraminated tube or set of nozzles 14 is located within the vessel 10 adjacent the bottom thereof and is conected with a conduit 15 which communicates with the respective outlet conduits 15a and 15b of a plurality of compressors 16a and 16b (only one or, alternatively, more than two may, of course, be provided), these constituting the compressor means 16 of the refrigerating machine. The compressors are provided with respective inlet conduits 17a and 17b connected to the outlets of evaporator means 18 including a plurality of corresponding evaporators 18a and 18b which communicate through conduits 19a and 19b with associated outlets of the liquid-collecting container 13, the conduits 19a and 19b having incorporated therein and being controlled by regulating throttle valves 20a and 20b.

Arranged within the vessel 10 is a coil or like conduit 21 which is in communication with a reservoir 22 containing a suitable coolant, such as water, which may be circulated from the reservoir to the coil and back by any suitable means (not shown). If desired, a slide valve (not shown) may be inserted into this circuit for regulation purposes.

Thus, it will be understood that the vessel 10 effectively constitutes a heat exchanger in which the liquid phase of the refrigerant or working medium 23 of the refrigerating machine is adapted to be placed into heat exchange relationship with the water or coolant flowing through the coil 21. The presence of the overflow pipe or opening 11 ensures that the vessel 10 can be filled with liquid refrigerant up to a predetermined level, leaving an empty or vapor space 24 at the top of the vessel 10.

From the foregoing it can be seen that the refrigerating machine-part of the overall combined system is constituted by the heat exchanger 10, the liquid-collecting container 13, the evaporator means 18 and the compressor means 16, the compressed vapors of the working medium or refrigerant entering the heat exchanger 10 via the nozzles 14. The heat exchanger thus constitutes the condenser of the refrigerating machine.

The vapor space 24 of the heat exchanger 10 communicates through a conduit or tube 25 (which may be provided with a shut-off valve 25') with inlet conduits 26a and 26b of a plurality of compressors 27a and 27b, respectively, constituting high pressure compressor means 27. The outlets of these compressors are connected through respective conduits 28a and 28b to a conduit or tube 29 having a valve 29' which communicates with the inlet of a high pressure condenser 30. The latter includes a cooling coil or conduit 31 through which flows water or a like fluid medium, the coil being connected through conduits 31a and 31b to means 32 in which the heat absorbed by the water in the condenser 30 is utilized. By way of example, the means 32 may comprise a central heating installation or any other type of heat-utilizing device. The outlet of the high pressure condenser 30 communicates through a conduit or tube 33 and through a control valve 34 with the heat exchanger 10 at a point below the overflow opening 11.

From the foregoing it will be understood that the heat exchanger 10 (which is also the condenser of the refrigerating machine), the high pressure compressor means 27 and the high pressure condenser 30 constitute the heat pump section of the combined system according to the present invention. It is to be noted that the term "high pressure" as applied to the compressor means 27 and the condenser 30 indicates that these are operated at pressures which are high compared to the pressures existing in the compressor means 16 and condenser 10 of the refrigerating machine.

The represented embodiment of the apparatus according to the invention operates as follows:

In the event that no heating is to take place, the apparatus is employed only for producing cold. At such time, the high pressure compressors 27a and 27b as well as the high pressure condenser 30 are cut off and put out of operation by suitable valves 25', 29' and 34 in conduits 25, 29 and 33 respectively. In such cases, the heat exchanger 10 works as a mixing condenser in which the vapors of the working medium of the refrigerating machine are condensed by contact with the liquid phase 23 of the said working medium. To the extent determined by the location of the overflow pipe or opening 11, some of the liquid flows from the vessel 10 through the pipe 12 into the liquid-collecting container 13, from which the working medium flows through the control or throttle valves 20a and 20b and conduits 19a and 19b into the evaporators 18a and 18b of the refrigerating plant. The heat liberated by condensing vapors in the vessel 10 is abducted or dissipated by the coolant in the coil 21.

If heating is required, the heat pump portion of the apparatus is put into operation by opening of the aforesaid valves in the conduits 25, 29 and 33. When this has been done, the vapors of the working medium in the heat exchanger 10 are condensed only if the amount of vapor supplied by the low pressure compressors 16a and 16b via conduit 15 and nozzles 14 exceeds the amount of the vapor taken off from the vapor space 24 by the high pressure compressors 27a and 27b. This is due to the fact that the pressure in the space 24 will increase as a function of the excess of vapor influx over vapor exhaustion, which, when coupled with the temperature difference between the vapor and liquid phases of the working medium (the liquid in the heat exchanger or condenser 10 is always colder than the vapors entering the same via the nozzles 14), will cause any vapor not required by the high pressure compressors to be condensed in the liquid.

If the amounts of the supplied and withdrawn vapors are equal, however, i.e., if the rate of inflow of vapors from the compressors 16a and 16b into the vessel 10 equals the rate of exhaust of the vapors from the vessel 10 by the high pressure compressors 27a and 27b, the vapor supplied from the refrigerating machine will not be condensed in the liquid phase-filled section of the vessel 10. Instead, it bubbles through the column of liquid, the vapor being practically cooled down to the temperature of the liquid and then passing to the high pressure compressors 27a and 27b. In such case, the heat exchanger 10 operates only as an intermediate cooler stage of the apparatus, and its temperature and pressure conditions are determined by the mean temperature of cooling water flowing through the cooling conduit 21.

If the amount of the vapor supplied from the refrigerating plant compressor means 16 to the heat exchanger 10 is less than that of the vapor taken off by the high pressure compressors 27a and 27b, the vapor deficiency is automatically compensated for by means of the liquid working medium present in the heat exchanger in such a manner as to return the system to the desired state of balance. In this case, the heat exchanger operates in the manner of an evaporator, the heat needed for evaporating the needed quantity of liquid working medium being extracted from the passing cooling water in the coil 21. As a result, the temperature of the cooling water drops and its outlet temperature at the point 21a will be less than its inlet temperature at the point 21b.

This cooling down attains its highest value if the refrigerating machine is put completely out of operation and all of the heat needed for heating has to be taken out of the cooling water. In such an eventuality, of course, the amount of heat which will be extracted from the cooling water in the coil 21 depends on the temperature drop between the points 21a and 21b and on the rate of flow of the cooling water. By way of example, if this rate of flow is 10,000 liters per hour, while the inlet and outlet temperatures are 20° C. and 10° C., respectively, then the amount of heat yielded by the water is 10×10,000=100,000 kilogram calories. In contradistinction, the outlet temperature of the cooling water will reach its highest value if the heat exchanger operates as a mixing condenser under full charge.

It will be readily understood from the foregoing that for heating purposes, regardless of whether or not the refrigerating machine is in operation, refrigerant vapors at a relatively low temperature, say from about 20 to 30° C., are taken from the heat exchanger 10, raised to a higher temperature by the high pressure compressors 27a and 27b, and fed to the high pressure condenser 30. There they will be condensed and will yield the proper amount of heat required for heating and raising the temperature of the fluid medium (water, air or the like) circulating through the coil 31 and the installation 32 (which may be, for example, a central heating system for a building, a domestic or industrial baking or drying apparatus, etc.). The condensed vapors are returned to the vessel 10 via conduit 33 and valve 34.

Thus, the heat exchanger will preferably be sized so as to enable it in the function of a boiler or evaporator to meet, together with the amount of heat supplied to the cycle by and corresponding to the work of the high pressure compressors, the desired highest heat requirements for the system 32 even if producing of cold is completely stopped. Accordingly, the output of the heat exchanger 10 is, in the order of magnitude, equal to the output of the high pressure or heating condenser 30 and sufficient to maintain the operation of the heat pump, despite the function of the heat exchanger 10 as a low pressure condenser, even where the amount of vapor supplied to the system by means of the refrigerating machine becomes twice as large as the amount of vapor employed for heating. As will be appreciated, in such a case half of the vapors of the working medium supplied by the low pressure compressors 16a and 16b will be sucked off by the high pressure compressors 27a and 27b, while the surplus amounts of vapor are liquified in the heat exchanger 10 which, therefore, works as a mixing condenser. If the heating output is to be still greater, further condensers connected parallel to the heat exchanger 10 may be inserted into the system.

It is evident, therefore, that in the combination of a refrigerating machine and a heat pump according to the present invention, the state of balance of the cold output and the heat output is obtained without any special control means quite automatically, the high pressure compressors being operated in a number which is needed for yielding an output corresponding to the heat requirement.

Stated in other words, the heat exchanger 10 and the coil 21 therein are sized so as to cause delivery to the high pressure compressor means 27 (which, of course, may comprise more than two compressors) of sufficient quantities of preliminarily heated working medium vapor, independently of the state of operation of the refrigerating machine, to ensure that upon further heating of the vapor by the high pressure compressor means the total heat present in the vapor for absorption by the water in the coil 31 of the high pressure condenser 30 is at least equal to the heat requirements of the installation 32.

From the foregoing it will be appreciated that the present invention provides, in addition to the already described novel apparatus, a method of jointly operating a refrigerating machine and a heat pump, which method is mainly characterized by the steps of placing the liquid and vapor phases of the working medium of the refrigerating machine into heat exchange relationship with a fluid coolant in an intermediate stage common to both the refrigerating machine and the heat pump and functioning as the condenser of the former, and employing at least some of the vapor phase of said working medium present in said intermediate stage as the heat transfer medium of the heat pump. In this manner, the coolant serves selectively for absorbing any excess heat of condensation of the working medium and for providing any required heat of vaporization therefor, to thereby automatically compensate for possible discrepancies between the actual heat content of said vapor phase of said working medium and the calculated heat content thereof required for operating the heat pump.

Although there has been described hereinabove a preferred embodiment of the present invention, it is to be understood that this disclosure is for the purpose of illustration only and that various omissions and changes in shape, proportion and arrangement of the parts, as well as the substitution of equivalent elements for the arrangements shown and described, may be made without departing from the scope of the invention as set forth in the appended claims.

What is claimed is:

1. In combination, a refrigerating machine comprising evaporator means, first compressor means and first condenser means connected in series with one another, and a heat pump comprising said first condenser means, second compressor means and second condenser means connected in series with one another, said first condenser means comprising a vessel adapted to contain the working medium for said refrigerating machine, overflow means establishing the connection between the interior of said vessel and said evaporator means and positioned so as to maintain a predetermined level of liquid working medium in said vessel and so as to maintain a vapor space above the liquid level, and a cooling coil located within said vessel and adapted to conduct a fluid coolant therethrough in heat exchange relationship with said working medium, said second compressor means being connected to said vessel in the region of said vapor space, and said second condenser means being connected to said vessel at a point below said liquid level therein.

2. The combination set forth in claim 1, said refrigerating machine further comprising a liquid-collecting container and throttling valve means connected in series with one another between said overflow means and said evaporator means, and nozzle means located within said vessel adjacent the bottom thereof and establishing the connection between said first compressor means and said first condenser means.

3. In the combination of a refrigerating machine and a heat pump; heat exchanger means common to both said refrigerating machine and said heat pump for placing the working medium of said refrigerating machine into heat exchange relationship with a fluid coolant, said heat exchanger means constituting the condenser means of said refrigerating machine, overflow means operatively connecting the interior of said heat exchanger means to the evaporator means of said refrigerating machine and positioned to maintain a predetermined level of the liquid phase of said working medium in said heat exchanger means, first conduit means connecting the vapor space of said heat exchanger means above said liquid level to the compressor means of said heat pump, second conduit means connecting the condenser means of said heat pump to said heat exchanger means at a point below said liquid level in the latter, and third conduit means connecting the compressor means of said refrigerating machine to said heat exchanger means at substantially the lowermost point of the latter and comprising a foraminated tube located within said heat exchanger means.

4. In the combination of a refrigerating machine and a heat pump; heat exchanger means common to both said refrigerating machine and said heat pump for placing the working medium of said refrigerating machine into heat exchange relationship with a fluid coolant, said heat exchanger means constituting the condenser means of said refrigerating machine, overflow means operatively connecting the interior of said heat exchanger means to the evaporator means of said refrigerating machine and positioned to maintain a predetermined level of the liquid phase of said working medium in said heat exchanger means, first conduit means connecting the vapor space of said heat exchanger means above said liquid level to the compressor means of said heat pump, and second conduit means connecting the condenser means of said heat pump to said heat exchanger means at a point below said liquid level in the latter, said heat exchanger means comprising a main vessel adapted to contain said working medium and communicating with said overflow means and said first and said second conduit means, and an independent conduit located within said vessel for conducting said coolant therethrough.

5. In combination, a refrigerating machine comprising evaporator means, first compressor means and first condenser means, and a heat pump comprising said first condenser means, second compressor means and second condenser means, said first condenser means comprising a vessel adapted to contain the working medium for said refrigerating machine, overflow means establishing a connection between the interior of said vessel and said evaporator means and positioned so as to maintain a predetermined level of liquid working medium in said vessel and so as to maintain a vapor space above the liquid level, said first compressor means being connected between said evaporator means and said vessel at a point below said liquid level therein, means connecting said vessel in the region of said vapor space to said second compressor means, said second condenser means being connected between said second compressor means and said vessel at a point below said liquid level therein, and reversible heat exchange means on said vessel in operative relationship to the working medium therein and adapted to selectively absorb excess heat of condensation of said working medium when the amount of vapor delivered by said first compressor means would otherwise be greater than required for operating said heat pump and provide any needed heat of vaporization of said working medium when the amount of vapor delivered by said first compressor means would otherwise be less than required for operating said heat pump.

6. A combination according to claim 5, said refrigerating machine further comprising a liquid-collecting container and throttling valve means connected in series between said overflow means and said evaporator means, and nozzle means located within said vessel adjacent the bottom thereof and establishing the connection between said first compressor means and said vessel.

7. A combination according to claim 5, said combination also comprising third conduit means connecting said first compressor means to said vessel at substantially the lowermost point of the latter and comprising a foraminated tube located within said vessel.

8. A combination according to claim 5, said heat exchanger means comprising a cooling coil located within said vessel and adapted to conduct a fluid coolant therethrough in heat exchange relationship with said working medium.

9. A combination according to claim 6, said heat exchanger means comprising a cooling coil located within said vessel and adapted to conduct a fluid coolant therethrough in heat exchange relationship with said working medium.

References Cited in the file of this patent

UNITED STATES PATENTS

| | | |
|---|---|---|
| 2,351,700 | Patterson | June 20, 1944 |
| 2,497,450 | Cygax | Feb. 14, 1950 |
| 2,553,623 | Zumbro | May 22, 1951 |
| 2,587,485 | Kline | Feb. 26, 1952 |
| 2,688,849 | Andrews | Sept. 14, 1954 |